Oct. 24, 1967 K. E. PERRY ETAL 3,349,406
MONITORING POSITION-INDICATING RECORDER
Filed June 23, 1965

INVENTORS
KENNETH E. PERRY
PAUL FERRIS SMITH

BY  *Rines and Rines*

ATTORNEYS

United States Patent Office 3,349,406
Patented Oct. 24, 1967

3,349,406
MONITORING POSITION-INDICATING
RECORDER
Kenneth E. Perry, Wayland, and Paul Ferris Smith, Waltham, Mass., assignors to Geodyne Corporation, Waltham, Mass., a corporation of Massachusetts
Filed June 23, 1965, Ser. No. 466,247
7 Claims. (Cl. 346—107)

ABSTRACT OF THE DISCLOSURE

Apparatus in which positional changes of sensing or other indicating devices, such as a compass, are sensed and encoded by an optical system including a flash lamp, an apertured code disc and light conductors. The sensing device, flash lamp, and code disc are disposed within a light-transmitting fluid-medium-containing housing, and the light conductors have one end sealed into the housing, the other end remotely positioned for viewing.

---

The present invention relates to monitoring position-indicating apparatus and, more specifically, to the monitoring in code symbols of positional changes of an indicating device.

In certain types of monitoring systems in which it is desired to provide coded symbols representative of positional changes of sensing or other indicating devices, it is desirable to use illuminated coding disc and the like to generate light signals corresponding to such positional changes. As an example, the changes in orientation of an underwater measurement apparatus may be indicated by a compass carried with the apparatus, the positional changes in which may be caused to be optically recorded by illumination of an encoding disc movable with the compass. It is to the solution of the problems in these types of systems of providing such optical encoding in an instantaneous manner, void of blurring, and the facile conveying of the light-coded impulses to a remote monitoring system, that the present invention is primarily directed.

A further object of the invention is to provide a novel monitoring apparatus of more general utility, also.

Still a further object is to provide a new and improved optical encoding apparatus.

Other and further objects will be explained hereinafter and will be more particularly pointed out in the appended claims; though, in summary, one of the preferred embodiments involves the transmission of flashes of light through a predetermined limited region only of an encoding disc that is moved in response to an indicating device, and the transmission of the light passed through said region during such flashes along a plurality of light conductors to a remote region where they may be monitored. Preferred constructional details are later presented.

Figure 3:
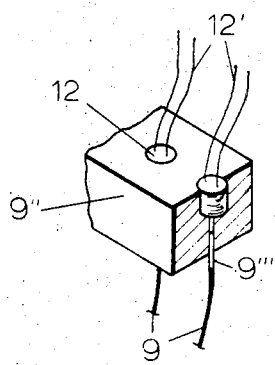
Figure 2:
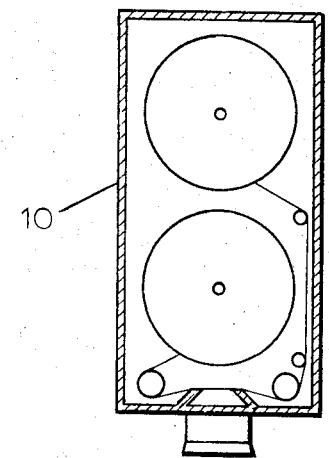
Figure 1:
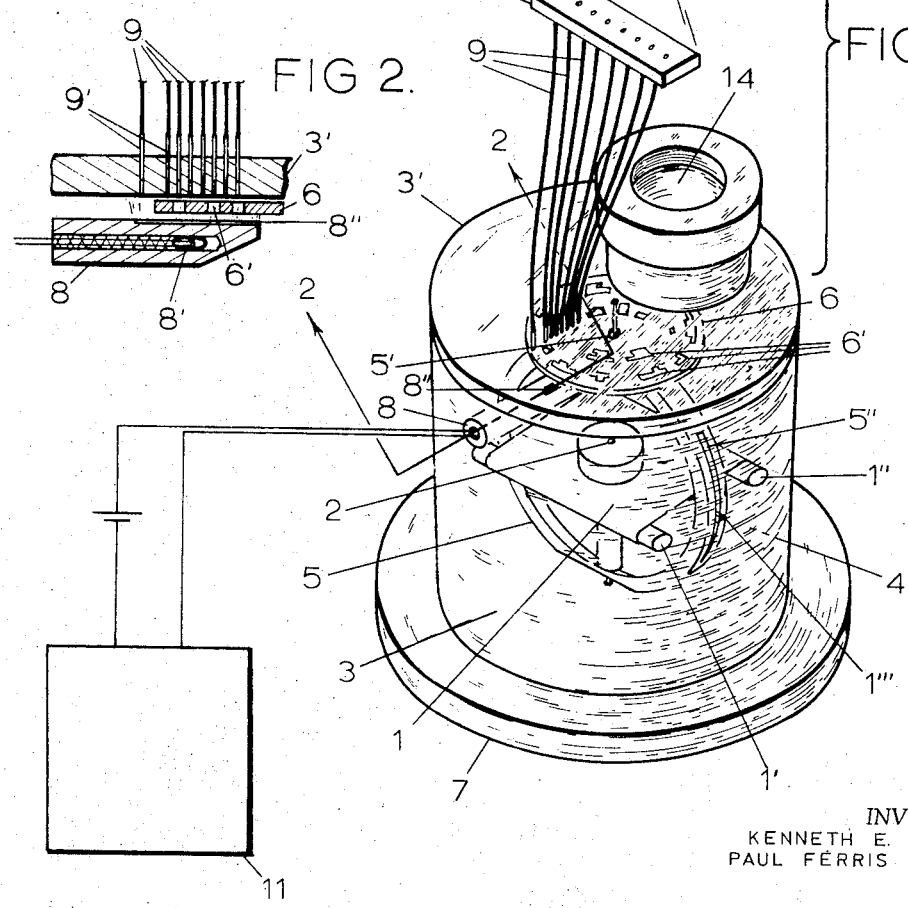

The invention will now be described with reference to the accompanying drawing, FIG. 1 of which is an isometric view illustrating the invention applied to the exemplary problem of remotely recording compass positional changes in coded symbols;

FIG. 2 is a fragmentary transverse section taken upon the line 2—2 of FIG. 1, looking in the direction of the arrows, and upon a somewhat enlarged scale; and FIG. 3 is a fragmentary detail of a modified field-of-view support embodying light-to-electric energy transducers for monitoring the optically coded signals.

Referring to FIG. 1, an indicating compass 1, comprising a mechanically connected pair of spaced-apart magnets 1' and 1", is shown mounted upon a jeweled pivot bearing 2 to permit positional changes or orientation thereof within a housing 3 containing a damping fluid 4 that is preferably light transparent and at least light-transmitting to some significant degree for optical reasons later made evident. The fluid 4 may, for example, be a silicon oil or kerosene the viscosity of which may be varied to adjust the damping of the indicating device 1 for the desired sensitivity. The compass 1 is mounted within a gimbal 5 connected at its uppermost region 5' to a planar encoding disc 6. The disc 6 is mounted in a plane (shown horizontal) orthogonal to the longitudinal axis of pivoting (shown vertical) of the indicating device 1. The device 1 has its third degree of orientable freedom provided by a pin 1''' movable upward and downward within a guide 5'' formed along a restricted arc portion of the gimbal 5. The encoder disc 6 will thus be rotated, moved or oscillated about its center axis synchronously with and in response to whatever positional changes the indicator device 1 may assume. If, for example, the apparatus is disposed in an underwater buoy or measuring system, as by mounting the support 7 within a cylindrical apparatus housing, the changes in orientation of the apparatus will be indicated by the compass 1, and the positional changes thereof will correspondingly rotate the encoder disc 6 in different degrees. A flexible diaphragm bellow-type expansion chamber 14 may be provided in the upper housing wall 3' for enabling expansion of the fluid medium 4 in such usage.

The encoder disc 6 is provided with a predetermined pattern of apertures 6' through which light may be projected by a light source 8 supported therebelow within the fluid 4, adjacent the underside of the disc 6. As more particularly shown in FIG. 2, the light source 8 comprises a lamp 8' disposed within a transparent support, as of glass or Lucite, the outer surface of which is rendered opaque, as by black paint, except for a predetermined transparent line or region 8'' defining a limited radial line segment of the disc 6. Disposed above that predetermined line on the upper side of the encoder disc 6 and within the upper wall 3' of the housing 3, are the lower set of ends of a plurality of light conductors, such as flexible optical fiber strands 9 defining a light-receiving line parallel to the said predetermined line of illumination transmitted at 8''.

As is more evident from the enlarged scale view of FIG. 2, each of the light conductors 9 is provided at its lower end with a larger-diameter solid light-conductive optical fiber 9' that is fitted within corresponding apertures in the upper housing wall 3'. The elements 9' not only seal the housing against escape of fluid 4 at the said apertures, but they serve as light-collimating devices for preventing lateral "cross-talk" or interference between the light signals transmitted in adjacent conductors as a result of passing through whatever apertures 6' have become alined between the predetermined line of the light source at 8' and the corresponding line of lower ends 9' of the light conductors 9. These light signals are thus coded signals that may then be transmitted external of the housing 3 by the light conductors 9 to a field of view 9'' remote from the housing 3. If desired, as shown, the conductors may be spaced wider apart at the field of view for enabling coded information to be monitored by, for example, a photographic moving picture recorder the lens of which is formed upon the field of view 9''. As the film of the photographic recorder 10 is moved past the field of view 9'', in response, for example, to a conventional timer, not shown, coded dots are photographically impressed on the film corresponding to the particular apertures 6' alined with the lower ends of the light conductors 9 which in turn correspond to the orientation of the compass 1.

Through the use of preferred flash illumination, as by flashing the lamp 8' from any conventional periodic strobe or trigger circuit 11, sharp instantaneous sets of digital coded information will be recorded without blurring, and pluralities of successive recorded information can later be averaged for analysis. As an illustration, for the particular underwater operation above described, the sampling or flashing rate has been adjusted to once every 2.5 or 5 seconds to accommodate for the approximately ⅙ second frequency of wave motion that ultimately operates upon the movement of the encoding disc 6. The light flashes for such application may have a pulse width of about 0.12 seconds.

Clearly other well-known types of recorders than a photographic camera may also be employed; and, indeed, the monitoring of the field of view need not be restricted to recording. As an example, in FIG. 3, the light conductors 9 are shown collimated by solid optical fibers 9''' upon monitoring light-to-electric energy photodiode or other transducers 12, the electrical outputs of which at 12' may be used, as desired. While, moreover, the invention has been described in connection with underwater compass indicator coded measurements, it is readily apparent that the features of invention and of the system described are readily adapted for a host of other applications with a wide variety of position-changing devices, herein generically termed "indicating devices," of widely different types and functions. Further modifications will also occur to those skilled in the art and all such are considered to fall within the scope and spirit of the invention as set forth in the appended claims.

What is claimed is:

1. Apparatus having, in combination, an indicating device, means for mounting such indicating device to permit changes in position thereof along a predetermined axis, encoding disc means provided with a predetermined pattern of apertures and mounted along the said axis to rotate thereabout in response to the positional changes of the indicating device, flash illumination means disposed at one side of the disc periodically to transmit flashes of light along a predetermined line through whatever apertures of the encoding disc are alined with such line at the instants of light flash, a plurality of light conductors disposed with one set of ends thereof mounted at the other side of above the disc along the said predetermined line and extending therefrom to provide at their other sets of ends a remote field of view, and recording means disposed to receive the light flashes transmitted through the encoding disc and conducted along the plurality of light conductors to the said field of view to record the aperture-coded information relating to changes in the position of the said indicating device, said indicating device, flash illumination means and encoding disc being disposed within a substantially light-transmitting fluid-medium-containing housing, said conductors extending through a wall of the housing and having their said other sets of ends outside the housing, whereby changes of position of said indicating means within said housing may be optically transmitted for remote monitoring.

2. Apparatus as claimed in claim 1 and in which the light conductors are provided at their said one set of ends with means for preventing light interference between adjacent conductors.

3. Apparatus as claimed in claim 2 and in which the interference-preventing means comprises a collimating section terminating each of the plurality of conductors at their said one set of ends adjacent the said predetermined line.

4. Apparatus as claimed in claim 1 and in which the housing is provided with pressure-sensitive expansion means.

5. Apparatus as claimed in claim 1 and in which the light conductors are mounted at their said one set of ends within a wall of the housing and there terminated in collimating light-conductive sections that also serve to prevent fluid leakage at the said wall.

6. Apparatus of the character described having, in combination, a housing containing a substantially light-transmitting fluid, position-orientable encoding means mounted within the fluid of the housing and provided with a predetermined pattern of apertures, sensor means within the housing for varying the position of the encoding means, illumination means disposed in the housing on one side of the encoding means to transmit flashes of light along a predetermined line through whatever apertures of the encoding means are alined with such line at the instants of illumination, and a plurality of light conductors disposed with one set of ends thereof mounted on the opposite side of the encoding means along the said predetermined line but within a wall of the housing and extending externally of the housing therefrom to provide at their other sets of ends a remote field of view, whereby variations of the position of the encoding means within said housing may be optically transmitted for remote monitoring.

7. Apparatus as claimed in claim 6 and in which the said one set of ends of the light conductors terminates at the said housing wall in collimating interference-preventing light-conductive members.

References Cited

UNITED STATES PATENTS

| | | | |
|---|---|---|---|
| 2,609,513 | 9/1952 | Boucher et al. | |
| 2,966,671 | 12/1960 | Abbott et al. | 340—347 |
| 2,982,175 | 5/1961 | Eisler | 88—24 |
| 3,109,065 | 10/1963 | McNaney | 250—227 X |
| 3,209,346 | 9/1965 | Little | 340—347 |
| 3,247,505 | 4/1966 | Coyle | 340—347 |
| 3,247,915 | 4/1966 | Chilton | 177—12 |

RICHARD B. WILKINSON, *Primary Examiner.*

J. W. HARTARY, *Assistant Examiner.*